C. E. Blake.
Safety Valve.
N° 86,273. Patented Jan. 26, 1869.

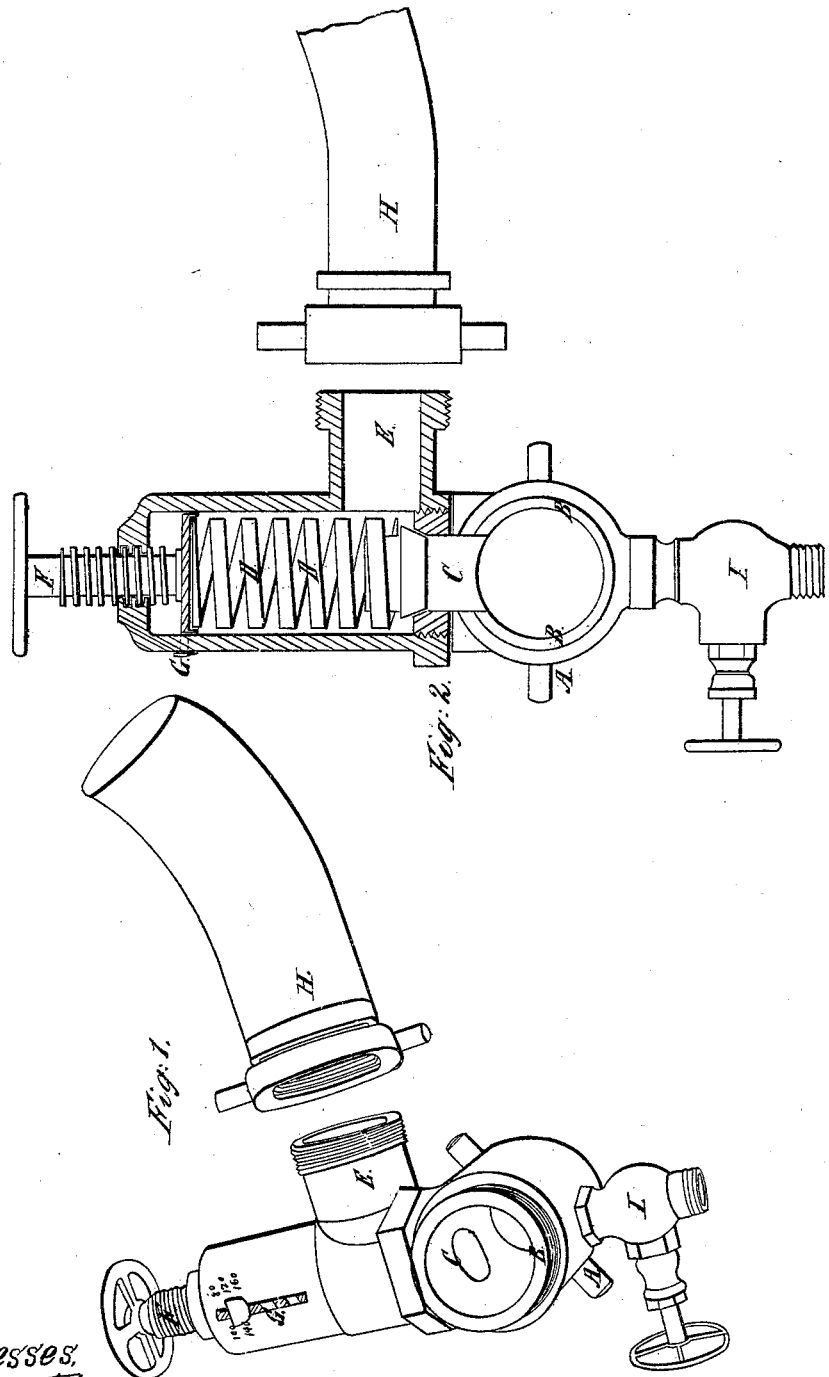

Witnesses.
J. H. Atkinson
J. Fleming

Inventor.
Chas. E. Blake

UNITED STATES PATENT OFFICE.

CHARLES EDWARD BLAKE, OF SAN FRANCISCO, CALIFORNIA.

IMPROVEMENT IN PUMP DEVICES FOR STEAM AND OTHER ENGINERY.

Specification forming part of Letters Patent No. 86,273, dated January 26, 1869.

*To all whom it may concern:*

Be it known that I, CHARLES EDWARD BLAKE, of the city of San Francisco, in the county of San Francisco and State of California, have invented a new and useful Improvement in Safety-Valves for Hydraulic Apparatus, Fire-Engines, &c.; and I do hereby declare the following to be a full, clear, and exact description of the same, reference being had to the accompanying drawings, which are made a part of this specification.

My invention consists of a device to be attached to the pump-body, air-chamber, or hose of a fire-engine, or other hydraulic apparatus, constructed with a spring-valve, or similar piece of mechanism, upon which the water may act, so as to cause the water to force the valve open when it is backed up by reason of the obstruction of the flow in the proper direction, thus removing the pressure by allowing the cause of it to pass out through a pipe attached to the device for that purpose.

Figure 3:
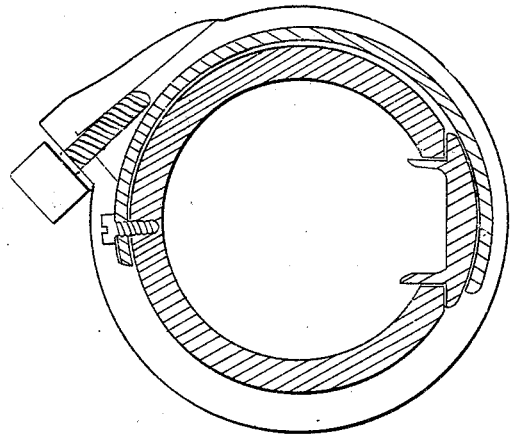
Figure 4:
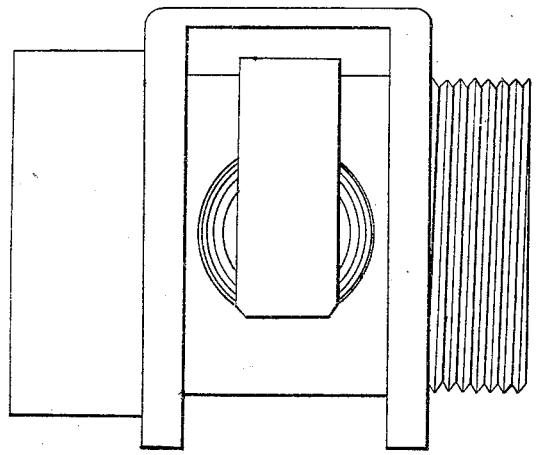

In the accompanying drawings, Figure 1 shows a perspective view of my improvement; Fig. 2, a longitudinal section; Fig. 3, a transverse section; and Fig. 4, a side view of my improvement, which may be attached anywhere along the hose or pipe.

In order that those skilled in the art may be enabled to make my invention, I subjoin the following further description.

In Fig. 1, A represents that portion of my improvement by which it is attached to the engine-pump, air-chamber, or hose. B is the screw or joint for attaching the main hose. C is the escape-valve upon which the water acts. D is the spring which controls the valve, holding it in position under the ordinary press of water. F is a screw to regulate the pressure which the valve is to resist. G is a graduated scale, showing the pressure of water upon the valve. H is a wasteway hose or pipe, to be attached to the safety-valve at E. I is an attachment to be used for the purpose of drawing off water at any time for use.

The spring shown in the drawings is spiral in form, but any other proper medium may be used to confine the valve in place that will give and allow it act when the pressure upon it shall exceed the desired amount.

Instead of a spiral spring, any other form of spring may be used, or the valve may be operated by a weight, elastic substance, pressure of steam, air, oil, or water, as desired.

In case it is desired to use the safety-valve upon the hose itself, it may be attached in the following manner: A metal or other suitable kind of ring may be placed around the hose at any desired point, having a hollow shoulder, upon which the part A may be screwed, or the connection may be made in any other mode, only so that it be complete.

The mode of operation is as follows: Suppose the safety-valve be fastened to the proper part of the engine or other apparatus, and the valve C regulated to resist a pressure corresponding with the amount which the hose is capable of sustaining, which we will suppose to be one hundred and sixty pounds to the square inch. If, as is often the case, the hose be plugged by sand or other matter, or becomes entangled or compressed by heavy substances falling upon it in any manner, so as to obstruct the free passage of the water from the engine-pump or other machine to the outer end of the hose or pipe, instead of the water bursting the pipe, as ordinarily is the case, the pressure caused by the back water and that caused by the working of the machine will raise the valve C and allow the surplus to pass off through the waste-pipe H.

By this invention the pressure of water in the hose may be regulated to any desired amount, and the hose kept from bursting or becoming strained or otherwise injured, in the manner as set forth.

The action of the safety-valve when applied to the hose-pipe itself is similar to its working when otherwise applied.

Having thus described my invention, what I claim, and for which I desire to secure Letters Patent, is—

1. The safety-valve apparatus A B C D E F G, constructed and arranged to operate substantially as set forth.

2. The arrangement of the devices A, B, C, G, F, E, and I with reference to a steam-pump or other enginery, as set forth.

CHAS. E. BLAKE.

Witnesses:
J. H. ATKINSON,
HENRY HAIGHT.